US012546200B1

(12) United States Patent
Chen et al.

(10) Patent No.: US 12,546,200 B1
(45) Date of Patent: Feb. 10, 2026

(54) METHODS FOR CONTROLLING FRACTURE HEIGHT IN UNCONVENTIONAL OIL AND GAS RESERVOIRS UNDER MULTI-BEDDING INTERFERENCE

(71) Applicant: SOUTHWEST PETROLEUM UNIVERSITY, Sichuan (CN)

(72) Inventors: Xiyu Chen, Chengdu (CN); Jingze Li, Chengdu (CN); Yongming Li, Chengdu (CN); Haiyang Tang, Chengdu (CN); Jinzhou Zhao, Chengdu (CN); Yanlin Lu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 19/305,735

(22) Filed: Aug. 20, 2025

(30) Foreign Application Priority Data

Jun. 30, 2025 (CN) ......................... 202510888834.9

(51) Int. Cl.
*E21B 43/26* (2006.01)
*E21B 47/06* (2012.01)
(Continued)

(52) U.S. Cl.
CPC .............. *E21B 43/26* (2013.01); *E21B 47/06* (2013.01); *E21B 49/00* (2013.01); *E21B 2200/20* (2020.05); *G01V 20/00* (2024.01)

(58) Field of Classification Search
CPC ...... E21B 43/26; E21B 49/00; E21B 2200/20; E21B 47/06; E21B 47/00; E21B 49/006; G01V 2210/646; G01V 20/00
See application file for complete search history.

(56) References Cited

U.S. PATENT DOCUMENTS

2018/0216441 A1* 8/2018 Gu .......................... E21B 43/26
2022/0290557 A1* 9/2022 Tello Gomez .......... E21B 43/26
(Continued)

FOREIGN PATENT DOCUMENTS

CN 119664308 A 3/2025

OTHER PUBLICATIONS

Jiang, Tingxue et al., Volume Fracturing Technology for Horizontal Well and Its Application, Lithologic Reservoirs, 2018, 8 pages.
(Continued)

*Primary Examiner* — Zakiya W Bates
(74) *Attorney, Agent, or Firm* — PORUS IP LLC

(57) ABSTRACT

A method for controlling a fracture height in unconventional oil and gas reservoirs under multi-bedding interference is provided. The method includes: obtaining geological parameters of a target horizontal well, and determining a fracturing fluid and construction parameters based on a production capacity target of the target horizontal well; determining a hydraulic fracturing process of the target horizontal well based on a hydraulic fracturing model for processing the multi-bedding interference, and evaluating the fracture height; comparing the fracture height with an expected control height, if the fracture height is greater than the expected control height, reducing a displacement of the fracturing fluid or a total time of a hydraulic fracturing to update the construction parameters until the fracture height is less than the expected control height; and performing the hydraulic fracturing on the target horizontal well based on updated construction parameters.

15 Claims, 5 Drawing Sheets

100

(51) Int. Cl.
*E21B 49/00* (2006.01)
*G01V 20/00* (2024.01)

(56) References Cited

U.S. PATENT DOCUMENTS

| | | | | |
|---|---|---|---|---|
| 2023/0229830 | A1 | 7/2023 | Zhao et al. | |
| 2025/0306227 | A1 * | 10/2025 | Khan ...................... | E21B 43/26 |

OTHER PUBLICATIONS

Fu, Haifeng et al., Three Dimensional Simulation of Hydraulic Fracture Propagation Based on Vertical Reservoir Heterogeneity, Natural Gas Industry, 42(5): 56-68, 2022.
Zhang, Jiu, Study on Multi-fracture Competition Propagation Law of Horizontal Well Fracturing in Shale Reservoir, Chinese Master's Theses Full-text Database, Engineering Science and Technology I Series, 2022, 85 pages.
Chen, Xiyu et al., Numerical Simulation of Fracture Height Growth with Interference of Bedding Plane and Stiffness Contrast in Shale Reservoirs, Engineering Fracture Mechanics, 322: 1-21, 2025.
Decision to Grant a Patent in Chinese Application No. 202510888834.9 mailed on Aug. 1, 2025, 6 pages.

* cited by examiner

100

200A

METHODS FOR CONTROLLING FRACTURE HEIGHT IN UNCONVENTIONAL OIL AND GAS RESERVOIRS UNDER MULTI-BEDDING INTERFERENCE

CROSS-REFERENCE TO RELATED APPLICATIONS

This application claims the priority of Chinese Patent Application No. 202510888834.9, filed on Jun. 30, 2025, the contents of which are hereby incorporated by reference.

TECHNICAL FIELD

The present disclosure relates to the field of hydraulic fracturing technology in oil and gas reservoir stimulation, and in particular relates to a method for controlling a fracture height in unconventional oil and gas reservoirs under multi-bedding interference.

BACKGROUND

Hydraulic fracturing technology, as a key measure for enhancing production in unconventional low-permeability oil and gas reservoirs, plays a crucial role in enhancing oil and gas recovery rates. Unconventional oil and gas reservoirs, such as shale gas reservoirs, contain a large number of near-horizontal bedding planes. These weak structural planes can interfere with the vertical propagation of hydraulic fractures, thereby affecting the fracture height created by the hydraulic fracturing. Fracture height control is crucial for improving the effectiveness of fracturing stimulation: when multiple oil and gas layers are distributed vertically, it is necessary to appropriately increase the fracture height to connect multiple thin layers to activate the production potential of multi-layer unconventional oil and gas reservoirs; however, when the oil and gas reservoir is thin or contains bottom water, an excessively large fracture height will significantly impair the effect of the oil and gas reservoir stimulation.

Therefore, there is a need to provide a method for controlling a fracture height in unconventional oil and gas reservoirs under multi-bedding interference to enable reasonable prediction and effective control of the fracture height.

SUMMARY

One or more embodiments of the present disclosure provide a method for controlling a fracture height in unconventional oil and gas reservoirs under multi-bedding interference. The method comprises: step S10, obtaining geological parameters of a target horizontal well, and determining a fracturing fluid and construction parameters based on a production capacity target of the target horizontal well; step S20, determining a hydraulic fracturing process of the target horizontal well based on a hydraulic fracturing model for processing the multi-bedding interference, and evaluating the fracture height; step S30, comparing the fracture height with an expected control height, if the fracture height is greater than the expected control height, reducing a displacement of the fracturing fluid or a total time of a hydraulic fracturing to update the construction parameters, and repeating step S20 and step S30 until the fracture height is less than the expected control height, and proceeding to step S40; and step S40, performing the hydraulic fracturing on the target horizontal well based on updated construction parameters.

In some embodiments, the geological parameters include a Young's modulus of a reservoir rock, a Poisson's ratio of a reservoir rock, a reservoir fracture toughness, a minimum horizontal principal stress, a vertical stress, a bedding tensile strength, a bedding fracture toughness, a bedding thickness, a bedding permeability, a bedding density, and an equivalent filtration coefficient.

In some embodiments, the construction parameters include a count of perforation clusters, a perforation height, a viscosity of the fracturing fluid, a density of the fracturing fluid, the displacement of the fracturing fluid, and the total time of the hydraulic fracturing.

In some embodiments, step S20 includes: determining a fluid pressure inside a hydraulic fracture, a fracture width, a fracture length, and the fracture height based on the hydraulic fracturing model for processing the multi-bedding interference.

In some embodiments, step S20 includes: step S21, calculating a fluid pressure inside a hydraulic fracture based on the geological parameters, an accumulated fracturing time, and the construction parameters; step S22, calculating a fracture width of the hydraulic fracture; step S23, calculating a fracture length of the hydraulic fracture; Step S24, calculating a stress intensity factor at an upper tip of the hydraulic fracture, a stress intensity factor at a lower tip of the hydraulic fracture, and a stress in a tip region of the hydraulic fracture; step S25, calculating a fracture encounter coefficient based on a bedding density, and determining whether a tip of the hydraulic fracture encounters bedding at a current moment, if the tip of the hydraulic fracture does not encounter the bedding at the current moment, comparing a stress intensity factor at the tip of the hydraulic fracture with a reservoir fracture toughness, if the stress intensity factor at the tip of the hydraulic fracture and the reservoir fracture toughness match an expansion critical condition, updating the fracture height of the hydraulic fracture, or if the stress intensity factor at the tip of the hydraulic fracture and the reservoir fracture toughness do not match the expansion critical condition, remaining the fracture height unchanged; if the tip of the hydraulic fracture encounters the bedding at the current moment, comparing the stress intensity factor at the tip of the hydraulic fracture with a bedding fracture toughness, and at the same time, comparing a maximum principal stress of the tip of the hydraulic fracture with a bedding tensile strength, if the stress intensity factor at the tip of the hydraulic fracture and the bedding fracture toughness match a bedding crossing critical condition and the maximum principal stress of the tip of the hydraulic fracture and the bedding tensile strength also match the bedding crossing critical condition, updating the fracture height, or if the stress intensity factor at the tip of the hydraulic fracture and the bedding fracture toughness do not match the bedding crossing critical condition, or the maximum principal stress of the tip of the hydraulic fracture and the bedding tensile strength do not match the bedding crossing critical condition, remaining the fracture height unchanged; step S26, if the tip of the hydraulic fracture encounters the bedding at the current moment, calculating a cumulative bedding filtration volume at the current moment, and calculating and updating an equivalent filtration coefficient based on the cumulative bedding filtration volume; and step S27, determining whether a fracturing construction is completed based on a relationship between the total time $T_a$ of the hydraulic fracturing and the accumulated fracturing time t: if $t<T_a$, determining that the fracturing construction is not completed, updating the accumulated fracturing time t to t+Δt, and repeating steps S21 to S27, or if $t \geq T_a$, determining that the fracturing construction is completed, and determining a fracture height at an end of the fracturing construction as the fracture height.

In some embodiments, the expansion critical condition includes that the stress intensity factor at the tip of the hydraulic fracture is greater than or equal to the reservoir fracture toughness.

In some embodiments, the bedding crossing critical condition includes that the stress intensity factor at the tip of the hydraulic fracture is greater than or equal to the bedding fracture toughness, and the maximum principal stress of the tip of the hydraulic fracture is greater than or equal to the bedding tensile strength.

In some embodiments, step S25 further includes: selecting, based on a position of the tip of the hydraulic fracture in contact with the bedding, whether the stress intensity factor at the tip of the hydraulic fracture is the stress intensity factor at the upper tip of the hydraulic fracture or the stress intensity factor at the lower tip of the hydraulic fracture.

BRIEF DESCRIPTION OF THE DRAWINGS

The present disclosure is further illustrated in terms of exemplary embodiments. These exemplary embodiments are described in detail with reference to the drawings.

These embodiments are non-limiting exemplary embodiments, in which like reference numerals represent similar structures, and wherein.

DETAILED DESCRIPTION

The technical solutions of the present disclosure will now be described clearly and completely with reference to the accompanying drawings. Obviously, the drawings described below are only some examples or embodiments of the present disclosure. Based on the embodiments in the present disclosure, all other embodiments obtained by a person of ordinary skill in the art without making creative efforts shall fall within the protection scope of the present disclosure.

Figure 1:
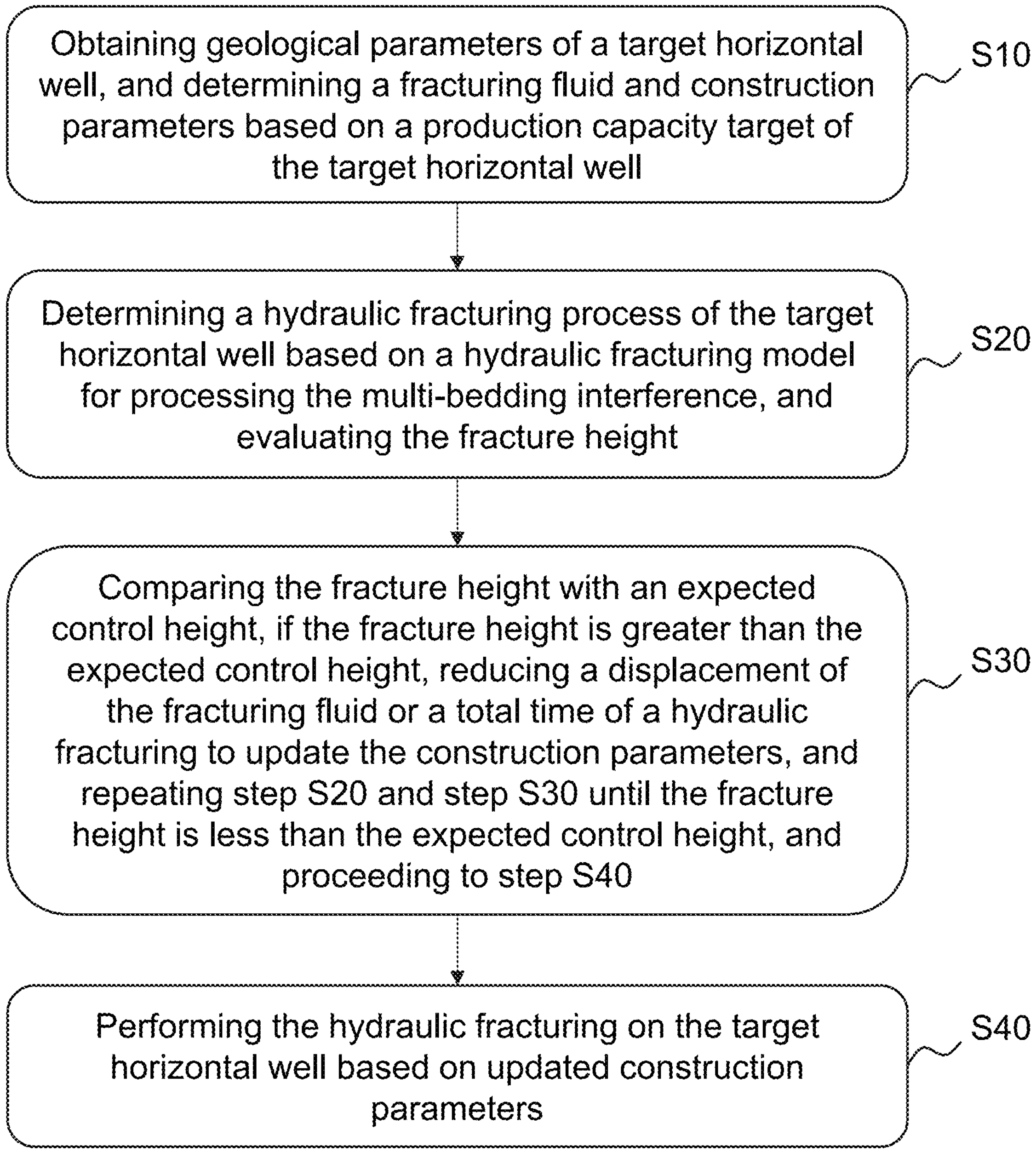
FIG. 1 is a flowchart illustrating a method for controlling a fracture height in unconventional oil and gas reservoirs under multi-bedding interference according to some embodiments of the present disclosure.

FIG. 1 is a flowchart illustrating a method for controlling a fracture height in unconventional oil and gas reservoirs under multi-bedding interference according to some embodiments of the present disclosure. As shown in FIG. 1, the process 100 includes the following steps.

In step S10, geological parameters of a target horizontal well are obtained, and a fracturing fluid and construction parameters are determined based on a production capacity target of the target horizontal well.

The target horizontal well refers to a horizontal well in an unconventional oil and gas reservoir requiring hydraulic fracturing stimulation. The unconventional oil and gas reservoir refers to an oil and gas resource that cannot be economically produced using conventional techniques and requires special development processes (such as processes for enhancing reservoir permeability or fluid properties) for commercial extraction. For example, the unconventional oil and gas reservoir may include shale gas, tight oil reservoirs, and the like. These oil and gas reservoirs are characterized by low permeability and contain vertically distributed bedding planes. These bedding planes of these oil and gas reservoirs have mechanical properties (such as lower tensile strength, fracture toughness, etc.) different from the rock matrix and may cause interference (i.e., multi-bedding interference, which refers to the hindering, deflection, or filtration effect of near-horizontal bedding plane weaknesses within the reservoir on the vertical propagation of hydraulic fractures) during reservoir development. When conducting the hydraulic fracturing, such bedding planes may block the vertical propagation of the hydraulic fractures across layers or induce filtration, leading to uncontrolled fracture height growth. The uncontrolled fracture height directly affects the stimulation effectiveness. Insufficient fracture height may fail to connect vertically stacked reservoirs, reducing the recovery rate of oil and gas resources. Excessive fracture height risks penetrating rock formations or connecting with bottom water, which may not only reduce the stimulation effect but may also trigger geological hazards or water-flooding risks. The hydraulic fracturing refers to an engineering technique of injecting fluid (i.e., the fracturing fluid) into a reservoir at high pressure to create and extend artificial fractures in the rock. The hydraulic fracturing can be used to establish high-conductivity flow channels in the reservoir, expand the seepage area of oil and gas, and increase single-well production. The hydraulic fracturing stimulation refers to a comprehensive engineering measure that improves reservoir seepage conditions through hydraulic fracturing technology to increase oil and gas production. The horizontal well refers to a directional well in which the wellbore inclination reaches approximately 90° and maintains this angle for a certain distance.

The geological parameters refer to relevant data representing the characteristics of rocks, reservoirs, and oil and gas reservoirs.

In some embodiments, the geological parameters may include at least one of a Young's modulus E of a reservoir rock, a Poisson's ratio v of a reservoir rock, a reservoir thickness H, a reservoir fracture toughness $K_{IC\text{-}1}$, a minimum horizontal principal stress $\sigma_h$, a vertical stress $\sigma_v$, a bedding tensile strength $T_o$, a bedding fracture toughness $K_{IC\text{-}2}$, a bedding thickness $w_r$, a bedding permeability $k_r$, a bedding density $C_k$, and an equivalent filtration coefficient $C_L$.

The Young's modulus of the reservoir rock refers to a parameter that represents the ability of the rock to resist elastic deformation. The Poisson's ratio of the reservoir rock refers to a parameter that represents a ratio of the rock's transverse strain to its longitudinal strain when the rock is under compression. The reservoir fracture toughness refers to a parameter that represents the ability of the reservoir rock to resist fracture propagation. The minimum horizontal principal stress refers to the minimum stress in the horizontal direction of the formation. The vertical stress refers to the stress in the vertical direction of the formation. The bedding tensile strength refers to a parameter that represents the strength of the bedding plane in resisting tensile failure. The bedding fracture toughness refers to a parameter that represents the ability of the bedding plane to resist the vertical propagation of the hydraulic fractures across layers. The bedding thickness refers to the thickness of the bedding plane. The bedding permeability refers to a parameter that represents the fluid permeability of the bedding plane. The bedding density refers to the count of beddings per unit of reservoir height. The equivalent filtration coefficient refers to a comprehensive coefficient for the filtration of the fracturing fluid into the formation. By setting the geological parameters to include a plurality of the foregoing parameters, a physical basis can be established for the subsequent prediction of the fracture height, and errors caused by parameter omission can be avoided.

In some embodiments, the geological parameters of the target horizontal well may be obtained in various manners. For example, the geological parameters of the target horizontal well may be obtained using measurement equipment such as a core pulse decay permeameter, an acoustic testing instrument, and the like. As another example, the geological parameters of the target horizontal well may be obtained through experimental manners such as mini-fracturing tests, three-point bending tests on cores, and the like. The specific measurement equipment, experimental manners, and the like may be set based on the experience or requirements of the operating personnel.

The production capacity target refers to a planned output of oil and gas resources within a target time period. For example, the production capacity target of the target horizontal well may be 10 tons/day.

The fracturing fluid refers to the fluid injected into the formation to create and extend fractures. For example, the fracturing fluid may include slick water, linear gum, and the like. In some embodiments, the fracturing fluid may be determined based on the production capacity target of the target horizontal well, according to a first preset rule. It should be understood that different fracturing fluids have different properties (such as viscosity, filtration coefficient, rheological properties, etc.), which result in different fracture geometries and different flow conductivity. Different production capacity targets correspond to different fracture requirements, which in turn require the selection of fracturing fluid with matching properties. For example, if the production capacity target of the target horizontal well is a high peak production capacity, the corresponding fracture requirement is an increase in the count of fractures. In this case, a low-viscosity fracturing fluid may be selected, which is easy to enter micro-fractures, bedding planes, etc., to increase the count of fractures. The first preset rule may be set based on experience or needs. For example, the first preset rule may be that when the production capacity target of the target horizontal well is A, fracturing fluid B is selected.

The construction parameters refer to controllable engineering parameters during a hydraulic fracturing construction.

In some embodiments, the construction parameters may include at least one of: a count of perforation clusters N, a perforation height, a viscosity $\mu$ of the fracturing fluid, a density $p_f$ of the fracturing fluid, a displacement $q_0$ of the fracturing fluid, and a total time of the hydraulic fracturing $T_a$.

The count of perforation clusters refers to a count of groups of independent perforation units in a single fracturing stage. The perforation height refers to a vertical coverage range of a perforation segment wherein perforations are located. The viscosity of the fracturing fluid refers to a parameter that reflects the ability of the fracturing fluid to resist shear deformation, which can characterize the fracturing fluid's sand-carrying capacity (the ability of the fracturing fluid to carry proppant into the fracture and distribute it evenly, which directly affects the integrity of the fracture conductivity channel) and filtration characteristics (the phenomenon of the fracturing fluid leaking into the formation pores during fracture propagation; excessive filtration reduces fracture propagation efficiency and damages the reservoir). Generally, the higher the viscosity of the fracturing fluid, the stronger the sand-carrying capacity, the lower the filtration, and the wider the resulting fracture width. The density of the fracturing fluid refers to the mass per unit volume of the fracturing fluid, which can affect the magnitude of the bottom-hole pressure. Generally, the higher the density of the fracturing fluid, the greater the bottom-hole pressure. The displacement of the fracturing fluid refers to a volume of the fracturing fluid injected into the well per unit time. The total time of the hydraulic fracturing refers to a total duration from the start of pumping the fracturing fluid to the cessation of injection during the hydraulic fracturing construction. Generally, the displacement of the fracturing fluid and the total time of the hydraulic fracturing are core construction parameters that determine the fracturing effect, and changes of the displacement of the fracturing fluid and the total time of the hydraulic fracturing directly affect key indicators such as fracture geometry. Generally, as the displacement of the fracturing fluid increases and the total time of the hydraulic fracturing increases, the fracture length, the fracture width, and the fracture height may all increase. By setting the above-mentioned construction parameters, the construction process can be quantified as precisely controllable engineering variables, which, in conjunction with the geological parameters in subsequent steps, achieve the desired hydraulic fracturing process of the target horizontal well.

In some embodiments, the construction parameters may be determined in various manners. For example, the construction parameters may be determined based on the production capacity target of the target horizontal well, according to a second preset rule. The second preset rule may be set based on experience or needs, for example, the second preset rule may be that when the production capacity target of the target horizontal well is A, the construction parameters are determined to be C. As another example, the construction parameters may be randomly generated by a processing device.

In some embodiments, step S10 may further include: determining a slipped bedding area using a shear slip model based on the geological parameters, an environmental parameter, formation stress field variation data, and candidate construction parameters; and determining the construction parameters based on the slipped bedding area.

The environmental parameter refers to a relevant parameter of the environment where the target horizontal well is located. For example, the environmental parameter may include a bottom-hole temperature of the target horizontal well, a bottom-hole pressure of the target horizontal well, etc. In some embodiments, the environmental parameter may be obtained through sensing devices installed in the environment where the target horizontal well is located. For example, the environmental parameter may be obtained through a downhole permanent pressure gauge, a downhole permanent temperature gauge, a memory pressure gauge, etc. It should be understood that by installing the electronic pressure gauge, the electronic temperature gauge, etc., at a specific location (usually near the perforation segment) downhole in the target horizontal well, pressure and temperature data at that location may be directly measured. The pressure and temperature data may be transmitted to the ground surface in real-time via a cable (i.e., the aforementioned data acquisition manner of the downhole permanent pressure gauge and the downhole permanent temperature gauge); or the pressure and temperature data may be read by retrieving the equipment from downhole after the hydraulic fracturing construction is completed (i.e., the aforementioned data acquisition manner of the memory pressure gauge). Formation stress field variation refers to the local, dynamic change in the original stress state of the rock surrounding the fracture due to the injection of the fracturing fluid during the hydraulic fracturing process.

The formation stress field variation data refers to data related to the formation stress field variation. For example, the formation stress field variation data may include stress change values of the rock, etc. In some embodiments, the formation stress field variation data may be measured and obtained using a sensing device such as a distributed fiber optic sensing device, a micro-seismic monitoring device, and the like.

The candidate construction parameters refer to construction parameters used for simulation by the shear slip model. For example, the candidate construction parameters may include a candidate count of perforation clusters, a candidate perforation height, a candidate viscosity of the fracturing fluid, a candidate density of the fracturing fluid, a candidate displacement of the fracturing fluid, a candidate total time of the hydraulic fracturing, etc. For more details about the construction parameters, the count of perforation clusters, the perforation height, etc., please refer to the relevant descriptions above.

The shear slip model is a model constructed based on the "Mohr-Coulomb criterion" in rock mechanics and is widely used in the field of numerical simulation of hydraulic fracturing.

The slipped bedding area refers to an area of bedding planes that undergo shear slip due to the seepage of fracturing fluid during the hydraulic fracturing process.

In some embodiments, the slipped bedding area may be determined by processing the geological parameters, the environmental parameters, the formation stress field variation data, and the candidate construction parameters using the shear slip model. Specifically, determining the slipped bedding area may include steps S201-S204.

In S201, a benchmark geomechanical model is established.

In some embodiments, the geological parameters (such as the Young's modulus, the Poisson's ratio, the minimum horizontal principal stress, the vertical stress, etc.) and the environmental parameters (such as the formation temperature and pressure of the target horizontal well) may be input into a processing device to construct a three-dimensional benchmark geomechanical model, which includes a discrete bedding network, providing benchmark information for subsequent parameter calculations.

In S202, the candidate construction parameters are generated and input.

In some embodiments, the candidate construction parameters may be determined based on sampling. An exemplary sampling process may include defining parameter ranges, stratification, sampling, and combination. Defining parameter ranges may involve setting a value range for each candidate construction parameter based on experience, requirements, historical construction parameters, etc. (e.g., setting a boundary value of the displacement of the fracturing fluid to be [8 $m^3$/min, 16 $m^3$/min] based on experience, etc.) Stratification may involve dividing the value range of each candidate construction parameter into N non-overlapping intervals (where N is a count of groups of candidate construction parameters to be generated, which may be set manually, for example, if N=5, the value range of each candidate construction parameter is divided into 5 equal intervals). Sampling may involve randomly selecting one value from each interval of each candidate construction parameter. Combination may involve randomly combining the N values drawn from the partitioned intervals of different candidate construction parameters into N complete sets of candidate construction parameters (for example, combining the values drawn from the first interval of each candidate construction parameter to form a first set of candidate construction parameters, and combining the values drawn from the fifth interval of each candidate construction parameter to form a fifth of set candidate construction parameters).

In S203, a dynamic fracturing simulation is performed using the shear slip model.

For each set of candidate construction parameters, the following time-stepping dynamic simulation is performed.

In S203-1, the growth of a main hydraulic fracture is calculated.

The main hydraulic fracture refers to a primary fracture generated during the hydraulic fracturing process. In some embodiments, the fluid pressure inside the main hydraulic fracture may be determined, with the specific determination manner referencing to the calculation in step S21; the geometric dimensions of the main hydraulic fracture (i.e., the fracture length, fracture width, and the fracture height of the main hydraulic fracture) may be determined, with the specific determination manner referencing to the calculations in steps S22-S23; and a bedding filtration volume may be determined, with the specific determination manner referencing to the calculation in step S26.

In S203-2, the slipped bedding area in the bedding surrounding the main hydraulic fracture is calculated.

In S203-2-1, changes in pressure and stress are calculated.

In S203-2-1-*a*, a pore pressure increment (ΔPp) inside the bedding is calculated. For example, based on the fluid pressure inside the main hydraulic fracture and the bedding filtration volume determined in step S203-1, the bedding permeability in the geological parameters, and the viscosity of the fracturing fluid in the candidate construction parameters, the pore pressure increment inside the bedding after the fracturing fluid seeps in is determined by formula (1):

$$\Delta Pp(x,t)=f(Pp_{frac},\mu,kr,CL,x,t) \quad (1),$$

where, ΔPp(x, t) denotes the pore pressure increment inside the bedding, x denotes a distance from the bedding to the main hydraulic fracture, t denotes a time of filtration, CL denotes the equivalent filtration coefficient (i.e., a parameter describing a rate of filtration), $Pp_{frac}$ denotes the fluid pressure inside the main hydraulic fracture, u denotes the viscosity of the fracturing fluid in the candidate construction parameters, and kr denotes the bedding permeability in the geological parameters;

In S203-2-1-*b*, the formation stress field variation data ($\Delta\sigma$) is calculated. For example, based on the pore pressure increment $\Delta Pp$ inside the bedding, the formation stress field variation data is determined by formula (2):

$$\Delta\sigma=\alpha\times\Delta Pp \quad (2),$$

where, $\Delta\sigma$ denotes the formation stress field variation data, $\alpha$ (Biot's coefficient) denotes an input geological parameter describing rock properties, which may be obtained through core lab experiments, estimation from acoustic logging data, etc.

In S203-2-2, a shear slip criterion is applied.

For each bedding plane in the model affected by the main hydraulic fracture, the calculated variations (i.e., $\Delta Pp$ and $\Delta\sigma$) from step S203-2-1 are used to determine whether the Mohr-Coulomb criterion is satisfied: $\tau_{new}\geq C+\mu_s*\sigma n_{eff}$. $\tau_{new}$ denotes an updated shear stress on the bedding, C denotes a cohesion, $\mu_s$ denotes a coefficient of static friction, C and $\mu_s$ are input geological parameters describing the strength of the bedding plane itself, and $\sigma n_{eff}$ denotes an updated effective normal stress. Further, $\tau_{new}=\tau_{initial}+\Delta\tau$, $\sigma n_{eff}=(\sigma n_{initial}+\Delta\sigma n)-(Pp_{initial}+\Delta Pp)$, where $\Delta Pp$ is obtained from step S203-2-1, $\Delta\tau$ and $\Delta\sigma n$ are the results of resolving the formation stress field variation data $\Delta\sigma$ (calculated in step S203-2-1) onto that bedding plane, $\tau_{initial}$ and $\sigma n_{initial}$ are initial state values calculated based on the input initial formation stress ($\sigma v$, $\sigma h$) and the orientation of that bedding plane, and $Pp_{nitial}$ is the input initial pore pressure inside the formation.

In S203-2-3, the slipped bedding area is recorded.

If a bedding plane satisfies the Mohr-Coulomb criterion in S203-2-2, the bedding plane is marked as a slipped bedding plane, and an area of the bedding plane is added to the slipped bedding area.

In S204, evaluation results are output.

After the simulation ends (i.e., after reaching the total time $T_a$ of the hydraulic fracturing), the total slipped bedding area for that set of candidate construction parameters is calculated and outputted.

By integrating multi-dimensional data such as the geological parameters and the formation stress field variation data, the shear slip model can be used to quantitatively predict the slipped bedding area during the fracturing process, which can avoid insufficient slip or excessive fragmentation of the bedding planes caused by traditional empirical estimation, thereby improving the efficiency of reservoir stimulation.

In some embodiments, the construction parameters may be determined based on the slipped bedding area. For example, the slipped bedding areas corresponding to each set of candidate construction parameters may be sorted by value, and the set of candidate construction parameters corresponding to the maximum value may be determined as the final construction parameter.

In some embodiments, the construction parameters may also include an injection parameter. The injection parameter refers to a parameter related to the injection of fracturing fluid into the formation. In some embodiments, the injection parameter may include an injection rate curve of the fracturing fluid, etc. The injection rate curve of the fracturing fluid refers to a curve that shows the change of the injection rate of the fracturing fluid over time, with time as the horizontal axis (X-axis) and the injection rate (such as volume flow rate) as the vertical axis (Y-axis).

In some embodiments, the injection parameter may be determined based on the total time of the hydraulic fracturing in the construction parameters, using a preset table. The preset table may include a correspondence between the total time of the hydraulic fracturing and the injection parameter (one total time of the hydraulic fracturing may correspond to at least one injection parameter). The preset table may be constructed based on historical data. For example, the preset table may be constructed based on a recorded curve of the rate over time during the injection process when the slipped bedding area is greater than a preset area threshold (set based on experience or needs, representing an allowable minimum slipped area) after injecting fracturing fluid in history, as well as the corresponding total time of the hydraulic fracturing. In some embodiments, a variable rate schedule (e.g., stepwise ramp-up) may be employed to determine a curve variation of the injection rate curve. For example, a high-displacement pulse may be used to generate instantaneous high pressure for penetrating stubborn bedding planes, followed by switching to a low-displacement shut-in phase to allow the fluid sufficient time to permeate along the bedding planes, inducing shear slippage. The precise design (such as the stepwise ramp-up, pulsed injection, etc.) of the injection rate curve can control the direction and width of fracture propagation to avoid fracture simplification, thereby forming a complex fracture network and improving the connectivity of flow channels of oil and gas.

In some embodiments, the construction parameters may also be generated based on an optimization search algorithm. The optimization search algorithm may include, but is not limited to, a genetic algorithm, a particle swarm optimization algorithm, and a simulated annealing algorithm, with an objective of maximizing the slipped bedding area. By generating the construction parameters based on the optimization search algorithm, it allows for a rapid traversal of a vast number of parameter combinations, thereby finding an optimal construction plan in a short time and saving time costs.

In some embodiments, the input to the shear slip model may also include an optimal perforation location. The optimal perforation location refers to a perforation location that satisfies a requirement related to production and achieves the best production performance. For example, the optimal perforation location may include a location that can simultaneously maximize fracture productivity, as well as minimize operational difficulty and construction risk. For more details about the optimal perforation location, please refer to the relevant descriptions below. By incorporating the optimal perforation location into the model calculation, the fracturing fluid can be accurately directed to high stress-differential zones, preferentially activating natural bedding planes and creating more effective fractures.

In some embodiments, the optimal perforation location may be determined based on the geological parameters and a bedding attitude. During a perforation operation phase, a perforation operation instruction is generated and sent to the perforating equipment, and the perforation operation instruction controls the perforating equipment to run into the optimal perforation location to perform the perforation operation.

The bedding attitude refers to comprehensive information describing a spatial position and morphological characteristics of the bedding. In some embodiments, the bedding attitude may include a geometric morphology of the bedding in the target horizontal well, such as a dip angle of the bedding in the target horizontal well, an orientation of the bedding in the target horizontal well, etc.

In some embodiments, the optimal perforation location may include at least one three-dimensional spatial location, which may be represented by a measured depth interval. For example, the optimal perforation location may include a first perforation cluster location, represented as a measured depth of [3502.0 m~3512.0 m]; and a second perforation cluster location, represented as a measured depth of [3545.5 m~3555.5 m].

It should be appreciated that in a highly brittle shale interval where bedding planes are densely distributed and oriented obliquely to a direction of the maximum horizontal principal stress, and where such an interval is sandwiched between two high-stress competent rock layers (e.g., tight sandstones), the optimal perforation location may be lie within the highly brittle shale interval.

In some embodiments, the optimal perforation location may be determined based on the geological parameters and the bedding attitude using a vector database.

Before vector construction, each feature from the geological parameters and the bedding attitude may be standardized. For example, each feature may be standardized by numerical normalization.

The vector database may include a plurality of feature vectors and their corresponding labels. The feature vectors in the vector database may be constructed based on a plurality of historical geological parameters and historical bedding attitudes, and the labels corresponding to the feature vectors may be historical optimal perforation locations. The labels may be determined based on perforation locations obtained from historical data where the slipped bedding area is greater than the preset area threshold (set based on experience or needs, representing the allowable minimum slipped area).

For example, a target vector may be constructed based on current geological parameters and a current bedding attitude. The vector database is then queried based on the target vector to determine a feature vector with the highest similarity to the target vector. The label corresponding to the feature vector with the highest similarity to the target vector is taken as the optimal perforation location for the target vector.

The perforating equipment refers to a device used for perforation during the hydraulic fracturing process. For example, the perforating equipment may include a shotgun, etc.

In some embodiments, a perforation operation instruction may be generated, based on the determined optimal perforation location, and sent to the perforating equipment to control the perforating equipment to run into the optimal perforation location and perform the perforation operation.

By analyzing the bedding attitude and the geological parameters, a natural fracture-developed zone can be precisely located, allowing the perforation locations to be maximally connected with a natural fracture network, thereby increasing the oil and gas recovery rate, while avoiding perforating in non-reservoir zones and reducing ineffective drilling costs.

In some embodiments, a three-dimensional bedding model may be constructed based on a geographic parameter, the bedding attitude, seismic data, and bedding composition of each candidate perforation location of the target horizontal well; the optimal perforation location may be determined based on the three-dimensional bedding model.

The geographic parameter refers to a parameter describing the spatial position, geometric morphology, and topography. For example, the geographic parameter may include data related to the spatial position (such as geographic coordinates of the target horizontal well), a topographic parameter (such as surface elevation, parameters of topographic relief), etc. The geographic parameter may provide a spatial framework and data benchmark for constructing a three-dimensional geological model (such as the three-dimensional bedding model described below), ensuring that the three-dimensional geological model can truly reflect the actual spatial distribution of underground structures. The geographic parameter may be obtained using a global positioning system (GPS), a remote sensing technology, and the like.

The seismic data refers to a collection of information that describes underground geological structures, lithology, and fluid distribution, formed by processing the recorded vibration signals returned after propagating through underground rock layers, which are generated by exciting seismic waves. In some embodiments, the seismic data may include a three-dimensional seismic volume (a three-dimensional spatial grid data volume formed by artificially exciting seismic waves, receiving reflection signals from underground strata, followed by professional processing), coherence data (a derivative data volume generated by local similarity analysis of the three-dimensional seismic volume, which may be used to quantify a difference in waveform characteristics of adjacent seismic traces), curvature data (a data volume generated by surface differential geometry calculations based on three-dimensional seismic interpretation horizons or the seismic volume itself, which may describe the degree of curvature of the formation interface in three-dimensional space), etc. The seismic data may be obtained through seismic exploration techniques, deployment of seismic observation systems for observation, and other manners.

The bedding composition refers to data and information describing characteristics of constituent components of the bedding. For example, the bedding composition may include mineral components, organic matter content, properties of infilling materials, etc. In some embodiments, the bedding composition may be obtained by prospecting the target horizontal well. For example, the bedding composition may be obtained by prospecting the target horizontal well using experimental manners such as imaging logging, elemental capture spectroscopy logging, etc.

The three-dimensional bedding model is a three-dimensional geological model constructed based on the bedding. The three-dimensional bedding model may be used to represent properties such as spatial geometric distribution, mechanical properties, and lithofacies composition of the bedding in a target reservoir. In the three-dimensional bedding model, each bedding plane may include data and information such as spatial position, dip angle, orientation, mechanical properties (fracture toughness, tensile strength), three-dimensional lithofacies distribution (distribution information of shale/sandstone/limestone, which may be obtained by prospecting the target horizontal well), and the bedding composition. In the three-dimensional bedding model, the geographic parameter may be annotated at the corresponding position on the three-dimensional bedding model. In some embodiments, a region requiring bedding analysis may be divided into regular or irregular grids (for example, triangular grids, hexahedral grids, etc.), with each grid cell containing the spatial position, thickness, bedding attitude, and mechanical properties of the bedding. On the basis of the divided grids, a three-dimensional geological modeling software (such as Petrel, GOCAD, EarthVision, etc.) may be used to integrate the geographic parameter, the bedding attitude, the seismic data, and the bedding composition to generate a heterogeneous bedding distribution model, which is the three-dimensional bedding model.

In some embodiments, the optimal perforation location may be determined based on the three-dimensional bedding model. An exemplary method may include the following steps S1 to S5.

S1, candidate perforation locations are generated.

A plurality of candidate perforation locations may be generated along a drilling trajectory of the target horizontal well at fixed intervals (e.g., every 0.5 meters, which may be preset based on experience or needs). The candidate perforation locations may be represented by measured depth. For example, candidate perforation location 1 is at a measured depth of 3312.4 m.

S2, key parameters are obtained.

For each candidate perforation location, the key parameters related to perforation may be extracted from the three-dimensional bedding model corresponding to the location of the candidate perforation location. The key parameters may include, but are not limited to, a brittleness index (representing a quantitative indicator of the rock's ability to undergo brittle failure rather than plastic deformation under fracturing, where a higher value indicates the rock is more likely to form a complex fracture network), a stress differential (i.e., a difference between the minimum horizontal principal stress and the vertical stress of a target layer, where a higher value indicates a stronger stress barrier to limit vertical fracture extension), and an angle between the bedding and the main hydraulic fracture (i.e., a spatial angle between the normal direction of the natural bedding plane and the normal direction of the artificial main hydraulic fracture plane, where certain numerical ranges are most conducive to activating the bedding and achieving optimal shear effects, while other ranges are relatively less effective).

S3, normalized scoring is performed on the key parameters.

It should be understood that since each key parameter has different units and numerical ranges, the key parameters need to be made dimensionless first, for example, the key parameters are converted to a uniform score between 0 and 100. For example, each key parameter may be scored according to a third preset rule. The third preset rule may be preset based on experience or needs. In some embodiments, when the key parameter is a brittleness index, the third preset rule may be: if the brittleness index is less than a first brittleness index threshold (preset based on experience or needs, e.g., 0.3), the brittleness index is assigned with a value of 0; if the brittleness index is greater than a second brittleness index threshold (preset based on experience or needs, where the second brittleness index threshold is greater than the first brittleness index threshold, e.g., 0.6), the brittleness index is assigned with a value of 100; and if the brittleness index is between the first brittleness index threshold and second brittleness index threshold, the brittleness index is assigned with a value according to a linear proportion. For example, a linearly proportional value assigned to the brittleness index may be (brittleness index−first brittleness index threshold)/(second brittleness index threshold−first brittleness index threshold)*100. It should be understood that the higher the brittleness index, the more brittle the rock, which is more favorable for perforation, and thus the higher the assigned value for the brittleness index. In some embodiments, when the key parameter is the stress differential, the third preset rule may be: if the stress differential is less than a first stress differential threshold (preset based on experience or needs, e.g., 2 MPa), a value of 0 is assigned to the stress differential; if the stress differential is greater than a second stress differential threshold (preset based on experience or needs, where the second stress differential threshold is greater than the first stress differential threshold, e.g., 8 MPa), a value of 100 is assigned to the stress differential; and if the stress differential is between the first stress differential threshold and second stress differential threshold, a value is assigned to the stress differential according to a linear proportion. For example, a linearly proportional value assigned to the stress differential may be (stress differential−first stress differential threshold)/(second stress differential threshold−first stress differential threshold)*100. It should be understood that the larger the stress differential, the better the stress shadowing effect, the more restricted the vertical extension of the main hydraulic fracture, reducing the risk of bedding crossing failure and perforation operations, and thus the higher the assigned value for the stress differential. In some embodiments, when the key parameter is the angle, the third preset rule may be: if the angle is within a first angle range (preset based on experience or needs, e.g.,) 50°~60°, a value of 100 is assigned to the angle; if the angle is within a second angle range (preset based on experience or needs, e.g., below 30° or above) 80°, a value of 0 is assigned to the angle; and if the angle is outside the first angle range and second angle range, a value is assigned to the angle according to a linear proportion. For example, a linearly proportional value assigned to the angle may be: if the angle is less than a lower limit of the first angle range, the assigned value is (angle−upper limit of the smaller numerical range in the second angle range)/(lower limit of the first angle range-upper limit of the smaller numerical range in the second angle range) *100; if the angle is greater than an upper limit of the first angle range, the assigned value is (angle−upper limit of the first angle range)/(lower limit of the larger numerical range in the second angle range−upper limit of the first angle range)*100. It should be understood that an angle within the first angle range is most favorable for shear slip, thus the assigned value for the angle is the highest; an angle within the second angle range is least favorable for shear slip, thus the assigned value for the angle is the lowest; and an angle outside both the first and second angle ranges, the shear slippage effect is moderate, and thus the assigned value for the angle is also moderate.

S4, a score for each candidate perforation location is determined through a weighted calculation.

The score for each candidate perforation location is determined through a weighted calculation based on the assigned values for the brittleness index, the stress differential, and the angle corresponding to each candidate perforation location, where the weights may be set based on experience or needs. For example, the score F1 for a candidate perforation location=(assigned value for the brittleness index×w1)+(assigned value for the stress differential×w2)+(assigned value for the angle×w3), where w1, w2, and w3 are the weights of the assigned values for the brittleness index, the stress differential, and the angle, respectively.

S5, based on the score of each candidate perforation location, the K candidate perforation locations with the highest scores are determined as the optimal perforation locations. The value of K may be set based on needs.

Through grid discretization and a multi-parameter scoring system, geological features (the brittleness index, the stress differential, the angle) are transformed into a quantifiable composite score, avoiding the errors caused by the subjectivity of traditional empirical judgment; through weighted summation of the various scores, a balance between a plurality of objectives is achieved, improving the precision and reliability of the perforation locations; the threshold design in the scoring system (such as the first brittleness index threshold, etc.) can directly exclude regions unsuitable for fracturing, avoiding risks such as sand blockage or fracture closure caused by perforating in highly plastic formations.

In step S20, the hydraulic fracturing process of the target horizontal well is determined based on a hydraulic fracturing model for processing the multi-bedding interference, and the fracture height is evaluated.

The hydraulic fracturing model for processing the multi-bedding interference refers to a relevant model of the hydraulic fracturing process that incorporates the multi-bedding interference into the processing workflow. For more details about the multi-bedding interference, please refer to the relevant descriptions above. In some embodiments, the hydraulic fracturing model for processing the multi-bedding interference may be of various types. For example, the hydraulic fracturing model may include a machine learning model, a multiple linear regression model, etc. In some embodiments, the hydraulic fracturing model for processing the multi-bedding interference may be composed of a plurality of preset formulas related to the geological parameters and the construction parameters.

In some embodiments, the hydraulic fracturing model for processing the multi-bedding interference may process the geological parameters and the construction parameters to calculate and determine a relevant parameter of the hydraulic fracturing process to represent the hydraulic fracturing process, and evaluate the fracture height. The relevant parameter of the hydraulic fracturing process may include a fracture dimension, etc. The specific calculation manner may be preset based on experience or needs.

In some embodiments, the step S20 may include: determining the fluid pressure inside a fracture (or hydraulic fracture), the fracture width, a fracture length, and the fracture height based on the hydraulic fracturing model for processing the multi-bedding interference.

The fluid pressure inside the fracture refers to the pressure exerted by the fluid inside the fracture on rock walls, which is a direct driving force for fracture propagation. The fracture width, the fracture length, and the fracture height are parameters related to the fracture dimensions.

In some embodiments, the fluid pressure inside the fracture, the fracture width, the fracture length, and the fracture height may be determined by calculation using preset formulas in the hydraulic fracturing model for processing the multi-bedding interference and the known geological parameters and construction parameters. For more details about the determination of the fluid pressure inside the fracture, the fracture width, the fracture length, and the fracture height, please refer to the relevant descriptions of steps S21 to S27 in FIG. 2A.

By using the hydraulic fracturing model for processing the multi-bedding interference to determine the fluid pressure inside the fracture, the fracture width, the fracture length, and the fracture height, key factors affecting the hydraulic fracturing process can be determined based on the hydraulic fracturing model, and the hydraulic fracturing process can be quantified to facilitate a more accurate fracture height evaluation subsequently.

Figure 2A:
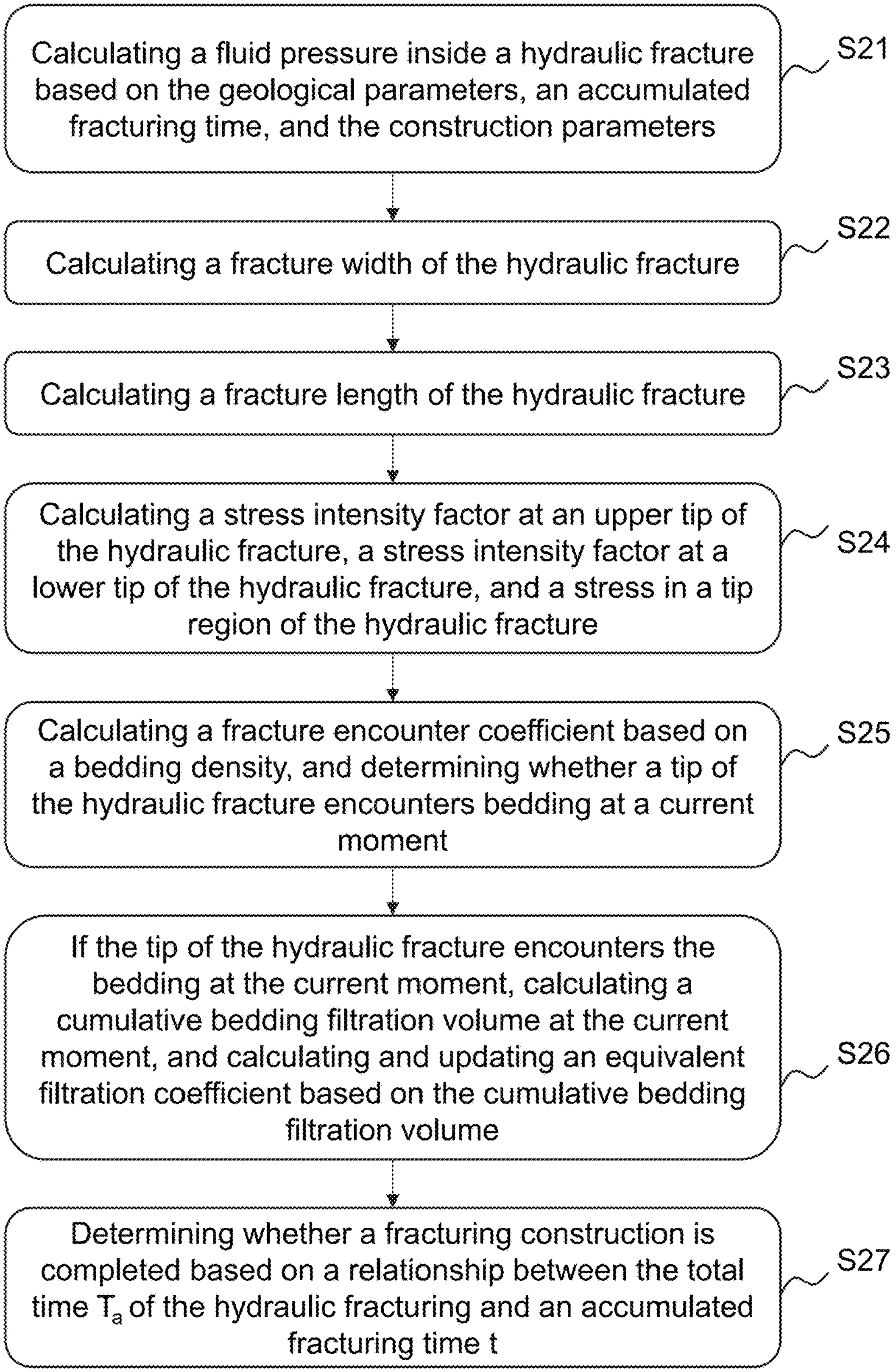
FIG. 2A is a flowchart illustrating an exemplary process for determining a fracture height according to some embodiments of the present disclosure.

In some embodiments, the step S20 may further include steps S21 to S27, the specific details of which may be referred to in FIG. 2A and its relevant descriptions.

In step S30, the fracture height is compared with an expected control height. If the fracture height is greater than the expected control height, the displacement of the fracturing fluid or a total time of the hydraulic fracturing is reduced to update the construction parameters, and the step S20 and the step S30 are repeated until an evaluated fracture height is less than the expected control height, and step S40 is performed.

The expected control height refers to a preset limit for the fracture height in the hydraulic fracturing design. In some embodiments, the expected control height may be set based on experience, needs, historical data, etc.

In some embodiments, if the fracture height is greater than the expected control height, the displacement of the fracturing fluid may be reduced by 0.01% to 5%. In some embodiments, the displacement of the fracturing fluid may also be reduced by 0.5% to 4.5%. In some embodiments, the displacement of the fracturing fluid may also be reduced by 1.0% to 4.0%. In some embodiments, the displacement of the fracturing fluid may also be reduced by 1.5% to 3.5%. In some embodiments, the displacement of the fracturing fluid may also be reduced by 2.0% to 3.0%. In some embodiments, the displacement of the fracturing fluid may also be reduced by 2.3% to 2.7%.

In some embodiments, if the fracture height is greater than the expected control height, the total time of the hydraulic fracturing may be reduced by 0.01% to 10%. In some embodiments, the total time of the hydraulic fracturing may also be reduced by 1% to 9%. In some embodiments, the total time of the hydraulic fracturing may also be reduced by 2% to 8%. In some embodiments, the total time of the hydraulic fracturing may also be reduced by 3% to 7%. In some embodiments, the total time of the hydraulic fracturing may also be reduced by 4% to 6%.

In step S40, the hydraulic fracturing is performed on the target horizontal well based on updated construction parameters.

In some embodiments, the updated construction parameters may be the reduced displacement of the fracturing fluid or reduced total time of the hydraulic fracturing.

In some embodiments, based on the count of perforation clusters and the perforation height in the updated construction parameters, the perforation operation instruction may be generated and sent to a perforator (a device used to penetrate the downhole casing and formation to create fluid channels). The perforation operation instruction may control the perforator to shoot perforation clusters into the formation. The count of perforation clusters is the count of perforation clusters in the updated construction parameters, and the depth of the perforation clusters is the perforation height in the updated construction parameters. Based on the total time of the hydraulic fracturing in the updated construction parameters, a time control instruction may be generated and sent to a fracturing pump. The time control instruction may control the fracturing pump to generate a stop signal when the accumulated fracturing time reaches the total time of the hydraulic fracturing in the updated construction parameters, thereby terminating the injection of fracturing fluid by the fracturing pump. Based on the displacement of the fracturing fluid in the updated construction parameters, a first displacement control instruction may be generated and sent to the fracturing pump (the core equipment that provides high-pressure fluid power for the fracturing operation, which pressurizes the fluid to the formation breakdown pressure through the reciprocating motion of plungers). The first displacement control instruction may control the fracturing pump to operate at a specific speed to maintain the displacement of the fracturing fluid in the fracturing pump at the displacement specified in the updated construction parameters. Based on the viscosity and density of the fracturing fluid in the updated construction parameters, a fracturing fluid control instruction may be generated and sent to a raw material blending unit (a container that may mix a plurality of raw materials and may be connected to the fracturing pump via pipelines to supply fracturing fluid to the fracturing pump). The fracturing fluid control instruction may control the raw material blending unit to deliver different components of the fracturing fluid (gelling agent, proppant, base fluid, etc.) to the fracturing pump at different rates, so that the viscosity and density of the fracturing fluid in the fracturing pump are as specified in the updated construction parameters.

By generating different construction control instructions and sending them to the corresponding equipment, full-process automated control of the fracturing operation can be achieved, reducing manual operation errors, improving construction efficiency and accuracy, and avoiding construction failures caused by parameter lag.

In some embodiments, based on the injection rate curve in the updated construction parameters, a second displacement control instruction may be generated and sent to the fracturing pump. The second displacement control instruction may control the fracturing pump to operate at a specific speed so that the displacement of the fracturing fluid in the fracturing pump meets a displacement requirement at each time point.

It should be understood that the processing device has limited ability to handle a continuous curve, so the curve may be discretized into a series of instruction points marked by timestamps. For example, the series of instruction points marked by timestamps may include one instruction point per second, etc. Exemplarily, the series of instruction points marked by timestamps may include: at t $$t=0\ \text{s},\ q=0.08\ \frac{\text{m}^3}{\text{s}};\ \text{at}\ t=1\ \text{s},\ q=0.1\ \frac{\text{m}^3}{\text{s}};\ \text{at}$$

$$t=2\ \text{s},\ q=0.2\ \frac{\text{m}^3}{\text{s}};\ \ldots\ ;\ \text{at}\ t=ns,\ q=x\ \frac{\text{m}^3}{\text{s}}.$$

q denotes the injection rate of the fracturing fluid, and t denotes the time point corresponding to the injection rate q.

Each time point refers to a moment corresponding to the injection rate obtained when the injection rate curve is discretized based on a time length. For example, if the total time of the hydraulic fracturing is 3600 s, and the discretization time length of the injection rate curve is 2 s, the time points may include 0 s, 2 s, 4 s, . . . , 3600 s.

In some embodiments, the second displacement control instruction has a higher priority than the first displacement control instruction. It should be understood that since both the first and second displacement control instructions control the speed of the fracturing pump, to avoid conflicts, the second displacement control instruction may be set to have a higher priority. If only one of the aforementioned displacement control instructions exists, the existing instruction is executed; if both the first and second displacement control instructions exist, the second displacement control instruction is executed, and the first displacement control instruction is ignored.

Through the introduction of data from the injection rate curve, refined strategies such as pulse-crossing and shut-in for fracture enhancement can be flexibly implemented according to the requirements of different fracturing stages, thereby maximizing the effective stimulated reservoir volume while controlling the fracture height.

In some embodiments of the present disclosure, by performing steps including step S10, obtaining the geological parameters of the target horizontal well, and determining the fracturing fluid and the construction parameters based on the production capacity target of the target horizontal well; step S20, determining the hydraulic fracturing process of the target horizontal well based on the hydraulic fracturing model for processing the multi-bedding interference, and evaluating the fracture height; step S30, comparing the fracture height with the expected control height, if the fracture height is greater than the expected control height, reducing the displacement of the fracturing fluid or the total time of the hydraulic fracturing to update the construction parameters, and repeating the step S20 and the step S30 until the evaluated fracture height is less than the expected control height, and proceeding to step S40; and step S40, performing the hydraulic fracturing on the target horizontal well based on the updated construction parameters, it is possible to comprehensively consider the influence of a plurality of parameters and factors on fracture height control, which facilitates the effective evaluation of fracture height dimensions for optimizing the overall effect of the hydraulic fracturing, and by dynamically iterating and updating the construction parameters, it is possible to minimize the adverse effects of difficult-to-control the fracture height due to the multi-bedding interference in unconventional reservoirs.

FIG. 2A is a flowchart illustrating an exemplary process for determining a fracture height according to some embodiments of the present disclosure. As shown in FIG. 2A, the process 200A includes the following steps:

In step S21, the fluid pressure inside the hydraulic fracture is calculated based on the geological parameters, the accumulated fracturing time, and the construction parameters.

In some embodiments, the calculation process for the fluid pressure inside the hydraulic fracture may be realized by a first preset formula. The first preset formula may be set based on experience or requirements, and an exemplary first preset formula may be as shown in formula (3):

$$p_f = 2\left(\frac{E'^3 q^2 \mu}{\pi^3 C_L h^6}\right)^{\frac{1}{4}} t^{\frac{1}{8}}, \tag{3}$$

where $p_f$ denotes the fluid pressure inside the fracture, in MPa; E' denotes the plane strain modulus (a parameter representing the elastic deformation capacity of the formation under a plane strain state), in MPa; q denotes a displacement of the fracturing fluid per cluster (a volume of fracturing fluid injected per unit time for a single perforation cluster in a multi-stage horizontal well), in $m^3/s$; μ denotes the viscosity of the fracturing fluid, in Pa·s; $C_L$ denotes the equivalent filtration coefficient, in $m/s^{0.5}$; h denotes the fracture height, in m; and t denotes the accumulated fracturing time (a total duration from the start of the hydraulic fracturing construction to the current moment), in s.

Before calculation, the accumulated fracturing time t may be initialized to t=0 s, the fracture encounter coefficient may be initialized to α=0, the cumulative bedding filtration volume may be initialized to $V_{leak}=0\ m^3$, and the count of encountered beddings may be initialized to M=0. Then steps S21~S27 are performed.

The plane strain modulus E' may be calculated according to formula (4):

$$E' = \frac{E}{1 - v^2}, \tag{4}$$

where E denotes the Young's modulus, in MPa; and v denotes the Poisson's ratio, dimensionless.

The displacement q of the fracturing fluid per cluster may be calculated according to formula (5):

$$q = \frac{q_0}{N}, \tag{5}$$

where $q_0$ denotes the displacement of the fracturing fluid, in $m^3/s$; and N denotes the count of perforation clusters, dimensionless.

In step S22, the fracture width of the hydraulic fracture is calculated.

In some embodiments, the calculation process for the fracture width of the hydraulic fracture may be realized by a second preset formula. The second preset formula may be set based on experience or requirements, and an exemplary second preset formula may be as shown in formula (6):

$$w = 4\left(\frac{q^2 \mu}{\pi^3 E'^{C_{L_h}}}\right)^{\frac{1}{4}} t^{\frac{1}{8}}, \tag{6}$$

where w denotes the fracture width, in m; q denotes the displacement of the fracturing fluid per cluster, in $m^3/s$; E' denotes the plane strain modulus, in MPa; μ denotes the viscosity of the fracturing fluid, in Pa·s; $C_L$ denotes the equivalent filtration coefficient, in $m/s^{0.5}$; h denotes the fracture height, in m; and t denotes the accumulated fracturing time, in s.

In step S23, the fracture length of the hydraulic fracture is calculated.

In some embodiments, the calculation process for the fracture length of the hydraulic fracture may be realized by a third preset formula. The third preset formula may be set based on experience or requirements, and an exemplary third preset formula may be as shown in formula (7):

$$l = \frac{q}{2\pi C_L h} t^{\frac{1}{2}}, \tag{7}$$

where l denotes the fracture length, in m; q denotes the displacement of the fracturing fluid per cluster, in $m^3/s$; C denotes the equivalent filtration coefficient, in $m/s^{0.5}$; h denotes the fracture height, in m; and t denotes the accumulated fracturing time, in s.

In step S24, a stress intensity factor at an upper tip of the hydraulic fracture, a stress intensity factor at a lower tip of the hydraulic fracture, and a maximum principal stress of the hydraulic fracture are calculated.

In some embodiments, the calculation process for the stress intensity factors at the upper tip and lower tip of the hydraulic fracture may be realized by a fourth preset formula. The fourth preset formula may be set based on experience or requirements, and an exemplary fourth preset formula may be as shown in formula (8):

$$K_{Iu} = \sqrt{\frac{\pi h}{2}}\left[pf - \sigma_{h,n} + \rho_f g\left(h_{cp} - \frac{3}{4}h\right)\right] \left\|1 + \sqrt{\frac{2}{\pi h}} \sum_{i=1}^{n-1} (\sigma_{h,i+1} - \sigma_{h,i})\left[\frac{h}{2}\arccos\left(\frac{h-2h_i}{h}\right) - \sqrt{h_i(h-h_i)}\right]\backslash\right. \quad bigmK_{Il} = \sqrt{\frac{\pi h}{2}}\left[pf - \sigma_{h,n} + \rho_f g\left(h_{cp} - \frac{h}{4}\right)\right]\left\|1 + \sqrt{\frac{2}{\pi h}} \sum_{i=1}^{n-1} (\sigma_{h,i+1} - \sigma_{h,i})\left[\frac{h}{2}\arccos\left(\frac{h-2h_i}{h}\right) + \sqrt{h_i(h-h_i)}\right],\right. \tag{8}$$

where $K_{Iu}$ and $K_{Il}$ denote the stress intensity factors at the upper tip and lower tip of the hydraulic fracture, respectively (parameters describing the intensity of the stress field at the fracture tip; the larger the stress intensity factor, the more concentrated the stress at the fracture tip, and the more likely the material is to undergo brittle fracture), in $MPa \cdot m^{1/2}$; h denotes the fracture height, in m; Pf denotes the fluid pressure inside the fracture, in MPa; $\sigma_{h,n}$ denotes the minimum horizontal principal stress at the upper tip of the hydraulic fracture (the smallest component of the three principal stresses in the horizontal direction of the formation, characterizing the compressive strength of the rock in the horizontal direction), in MPa; $\sigma_{h,i}$ denotes the minimum horizontal stress at the i-th layer, in MPa; $\sigma_{h,i+1}$ denotes the minimum horizontal stress at the (i+1)-th layer, in MPa; $p_f$ denotes the density of the fracturing fluid, in $kg/m^3$; hcp denotes the perforation height, in m; $h_i$ denotes a distance from the lower tip of the hydraulic fracture to the top of the i-th layer, in m; and g denotes the acceleration due to gravity.

For the upper tip of the hydraulic fracture, assuming that $K_I = K_{Iu}$, and for the lower tip of the hydraulic fracture, assuming that $K_I = K_{Il}$, then formula (9) is obtained as follows:

$$\sigma_{zz} = \sigma_v - \frac{K_I}{\sqrt{2\pi r}}\cos\frac{\theta}{2}\left(1 - \sin\frac{\theta}{2}\sin\frac{3\theta}{2}\right)\Bigg\| 1\sigma_{yy} = \sigma_h - \frac{K_I}{\sqrt{2\pi r}}\cos\frac{\theta}{2}\left(1 + \sin\frac{\theta}{2}\sin\frac{3\theta}{2}\right)\Bigg\| 1\tau_{zy} = -\frac{K_I}{\sqrt{2\pi r}}\sin\frac{\theta}{2}\cos\frac{\theta}{2}\cos\frac{3\theta}{2}, \tag{9}$$

where $\sigma_{zz}$ and $\sigma_{yy}$ denote the vertical and horizontal normal stresses at the tip of the hydraulic fracture, respectively, in MPa; $\tau_{zy}$ denotes the shear stress at the tip of the hydraulic fracture, in MPa; $\sigma_v$ and $\sigma_h$ denote the vertical stress and the minimum horizontal principal stress at the tip of the hydraulic fracture, respectively, in MPa; r and θ denote polar coordinates in a polar coordinate system with the tip of the hydraulic fracture as an origin; and $K_I$ denotes the stress intensity factor at the upper tip or lower tip of the hydraulic fracture.

In some embodiments, the calculation process for the maximum principal stress of the hydraulic fracture may be realized by a fifth preset formula. The fifth preset formula may be set based on experience or requirements, and an exemplary fifth preset formula may be as shown in formula (10):

$$\sigma_1 = \frac{\sigma_{zz} + \sigma_{yy}}{2} + \sqrt{\left(\frac{\sigma_{zz} - \sigma_{yy}}{2}\right)^2 + \tau_{zy}^2}, \tag{10}$$

where $\sigma_{zz}$ and $\sigma_{yy}$ denote the vertical and horizontal normal stresses at the tip of the hydraulic fracture, respectively, in MPa; $\tau_{zy}$ denotes the shear stress at the tip of the hydraulic fracture, in MPa; and $\sigma_1$ denotes the maximum principal stress, in MPa.

In step 25, a fracture encounter coefficient at the current moment is calculated based on a bedding density, and whether the tip of the hydraulic fracture encounters the bedding at the current moment is determined.

In some embodiments, the calculation process for the fracture encounter coefficient may be realized by a sixth preset formula. The sixth preset formula may be set based on experience or requirements, and an exemplary sixth preset formula may be as shown in formula (11):

$$\alpha_n=\alpha_{n-1}+\Delta h C_k \quad (11),$$

where $\alpha_n$ denotes the fracture encounter coefficient at the current moment, dimensionless; $\alpha_{n-1}$ denotes the fracture encounter coefficient at the previous moment, dimensionless; $\Delta h$ denotes a step size of the fracture height growth, in m; and $C_k$ denotes the bedding density, in 1/m.

Figure 2B:
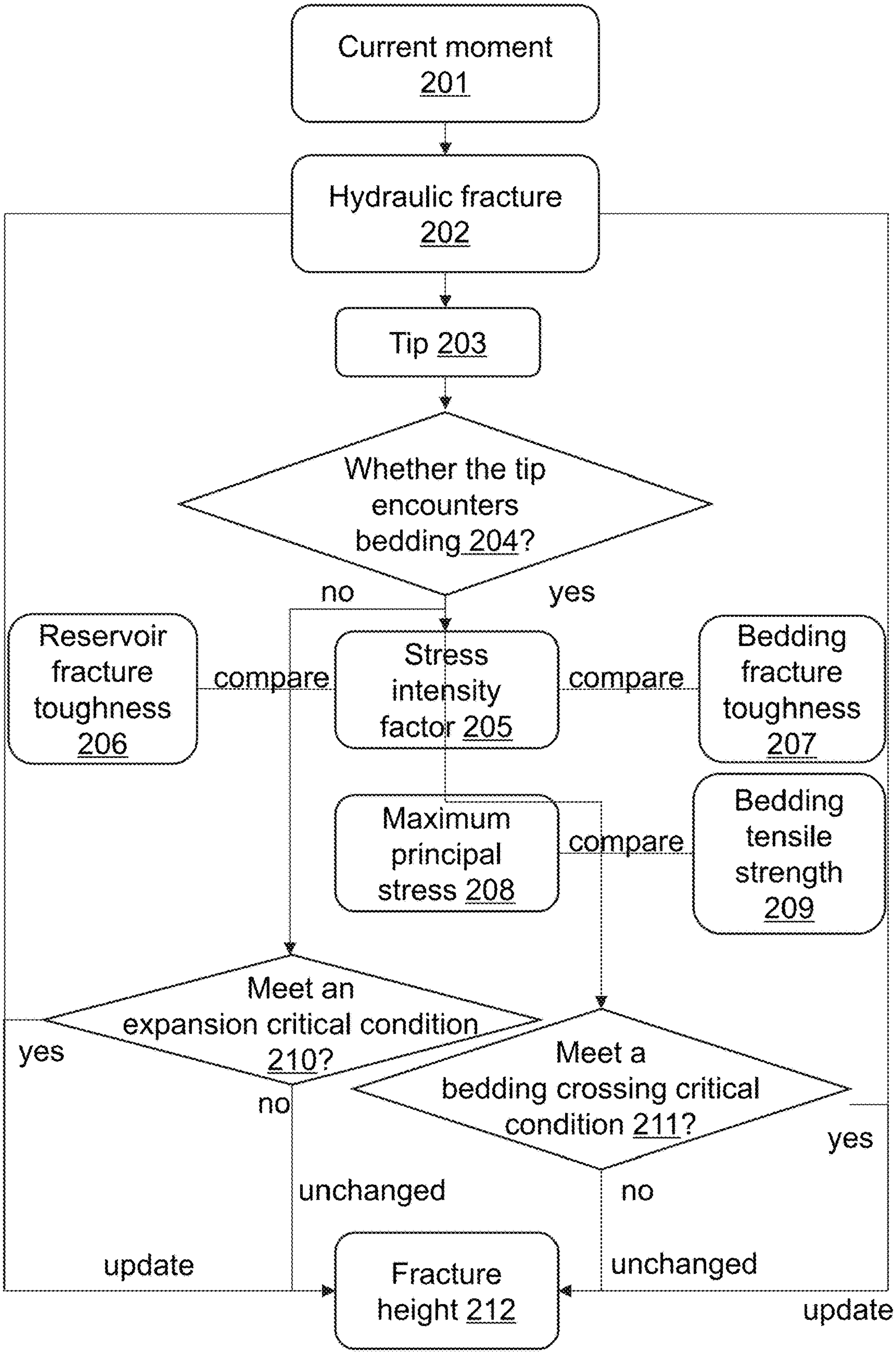
FIG. 2B is a schematic diagram illustrating an exemplary process for determining whether a tip of a hydraulic fracture encounters bedding at a current moment according to some embodiments of the present disclosure.

FIG. 2B is a schematic diagram illustrating an exemplary process for determining whether a tip of a hydraulic fracture encounters bedding at a current moment according to some embodiments of the present disclosure.

If the fracture encounter coefficient at the current moment 201 is <1, it is determined that the tip 203 of the hydraulic fracture 202 does not encounter the bedding 204. As shown in FIG. 2B, comparing the stress intensity factor 205 $K_I$ at the tip 203 of the hydraulic fracture 202 with the reservoir fracture toughness 206 $K_{IC-1}$, if the stress intensity factor 205 $K_I$ at the tip 203 of the hydraulic fracture 202 and the reservoir fracture toughness 206 $K_{IC-1}$ match an expansion critical condition 210, the fracture height 212 of the hydraulic fracture 202 is updated.

The expansion critical condition 210 refers to a critical condition for determining whether the hydraulic fracture 202 can continue to propagate. In some embodiments, the expansion critical condition 210 includes that the stress intensity factor 205 $K_I$ at the tip 203 of the hydraulic fracture 202 is greater than or equal to the reservoir fracture toughness 206 $K_{IC-1}$, i.e., $K_I \geq K_{IC-1}$. It should be understood that when the stress intensity factor 205 $K_I$ at the tip 203 of the hydraulic fracture 202 is greater than or equal to the reservoir fracture toughness 206 $K_{IC-1}$, the fracture may necessarily continue to propagate, and the corresponding fracture height 212 also needs to be updated. By setting the expansion critical condition, the physical essence of fracture propagation in the matrix rock is transformed into a quantifiable rigid criterion, which solves the problem of unclear fracture propagation timing in traditional models.

In some embodiments, if $K_I$ is greater than or equal to $K_{IC-1}$, the fracture height is updated as $h_n=h_{n-1}+\Delta h$; if K, is less than $K_{IC-1}$, the fracture height 212 remains unchanged.

If the fracture encounter coefficient at the current moment is ≥1, it is determined that the tip 203 of the hydraulic fracture 202 encounters the bedding 204. As shown in FIG. 2B, comparing the stress intensity factor 205 $K_I$ at the tip 203 of the hydraulic fracture 202 with the bedding fracture toughness 207 $K_{IC-2}$, and at the same time, comparing the maximum principal stress 208 σ1 at the tip 203 of the hydraulic fracture 202 with the bedding tensile strength 209 $T_0$, if the stress intensity factor 205 $K_I$ at the tip 203 of the hydraulic fracture 202 and the bedding fracture toughness 207 $K_{IC-2}$ match a bedding crossing critical condition 211, and the maximum principal stress 208 σ1 at the tip 203 of the hydraulic fracture 202 and the bedding tensile strength 209 $T_0$ also match the bedding crossing critical condition 211, the fracture height 212 is updated; if the stress intensity factor 205 $K_I$ at the tip 203 of the hydraulic fracture 202 and the bedding fracture toughness 207 $K_{IC-2}$ do not match the bedding crossing critical condition 211, or the maximum principal stress 208 σ1 at the tip 203 of the hydraulic fracture 202 and the bedding tensile strength 209 $T_0$ do not match the bedding crossing critical condition 211, the fracture height 212 remains unchanged.

The bedding crossing critical condition 211 refers to a critical condition for determining whether the hydraulic fracture 202 can cross the bedding 204. In some embodiments, the bedding crossing critical condition 211 includes that the stress intensity factor 205 $K_I$ at the tip 203 of the hydraulic fracture 202 is greater than or equal to the bedding fracture toughness 207 $K_{IC-2}$, and at the same time, the maximum principal stress 208 σ1 at the tip 203 of the hydraulic fracture 202 is greater than or equal to the bedding tensile strength 209 $T_0$, i.e., $K_I \geq K_{IC-2}$ and $\sigma_1 \geq T_o$. It should be understood that when the stress intensity factor 205 $K_I$ at the tip 203 of the hydraulic fracture 202 is greater than or equal to the bedding fracture toughness 207 $K_{IC-2}$, and the maximum principal stress 208 σ1 at the tip 203 of the hydraulic fracture 202 is greater than or equal to the bedding tensile strength 209 $T_0$, the hydraulic fracture 202 may necessarily be able to cross the bedding 204, and the corresponding fracture height 212 also needs to be updated. By setting the bedding crossing critical condition, the physical essence of fracture penetration through the bedding is transformed into a quantifiable rigid criterion, which solves the problem of unclear fracture crossing timing in traditional models.

In some embodiments, if $K_I$ is greater than or equal to $K_{IC-2}$, and σ1 is greater than or equal to $T_o$, the fracture height is updated as $h_n=h_{n-1}+\Delta h$; otherwise, the fracture height 212 remains unchanged. Thereafter, the fracture encounter coefficient is reset as $\alpha=0$, and the current count of encountered beddings is set as $M_n=M_{n-1}+1$.

$h_n$ denotes the fracture height at the current moment, and $h_{n-1}$ denotes the fracture height at the previous moment; $M_n$ denotes the count of encountered beddings at the current moment, and $M_{n-1}$ denotes the count of encountered beddings at the previous moment.

In some embodiments, whether the stress intensity factor 205 at the tip 203 of the hydraulic fracture 202 is the stress intensity factor at the upper tip of the hydraulic fracture 202 or the stress intensity factor at the lower tip of the hydraulic fracture 202 is determined based on a position of the tip 203 of the hydraulic fracture 202 in contact with the bedding 204. That is, in the foregoing calculation process, the stress intensity factor 205 to be calculated needs to be selected based on the position of the tip of the hydraulic fracture in contact with the bedding 204. If the upper tip of the hydraulic fracture is in contact with the bedding, the stress intensity factor at the upper tip should be selected for calculation; and if the lower tip of the hydraulic fracture is in contact with the bedding, the stress intensity factor at the lower tip should be selected for calculation. In a complex geological environment with the multi-bedding interference, the propagation behavior of a hydraulic fracture is often significantly affected by the bedding planes. By selecting the corresponding stress intensity factor based on the position of the tip of the hydraulic fracture in contact with the bedding, the propagation behavior of the hydraulic fracture near the bedding plane may be more accurately simulated, thereby improving the accuracy of fracture height prediction.

In step S26, if the tip of the hydraulic fracture encounters the bedding at the current moment, the cumulative bedding filtration volume at the current moment is calculated, and the equivalent filtration coefficient is calculated and updated based on the cumulative bedding filtration volume.

In some embodiments, the calculation process for the cumulative bedding filtration volume may be realized by a seventh preset formula. The seventh preset formula may be set based on experience or requirements, and an exemplary seventh preset formula may be as shown in formula (12):

$$V'_{leak} = v_{leak} + \sum_{m=1}^{M} \sqrt{\frac{2k_r p_f}{\mu}(t - t_0)}\, t_0 w_r l, \tag{12}$$

where $V'_{leak}$ denotes the updated cumulative bedding filtration volume (a total volume of fracturing fluid that has filtered into the surrounding formation through bedding planes as the fracture propagates across the bedding planes during the entire hydraulic fracturing process), in $m^3$; $V_{leak}$ denotes the cumulative bedding filtration volume, in $m^3$; M denotes the total count of encountered beddings, dimensionless; m denotes the index of the encountered bedding, dimensionless; k, denotes the bedding permeability, in $m^2$; t and t0 denote the accumulated fracturing time and a bedding filtration time (the time elapsed from the start of fracturing to a certain moment during which fracturing fluid filters into the surrounding formation through a bedding plane), respectively, in s; $w_r$ denotes the bedding thickness, in m; and l denotes the fracture length, in m.

In some embodiments, the calculation process for the equivalent filtration coefficient may be realized by an eighth preset formula. The eighth preset formula may be set based on experience or requirements, and an exemplary eighth preset formula may be as shown in formula (13):

$$C'_L = C_L + \frac{V_{leak}}{\sqrt{t}\, hl}, \tag{13}$$

where $C'_L$ denotes the updated equivalent filtration coefficient, in $m/s^{0.5}$; $C_L$ denotes the equivalent filtration coefficient, in $m/s^{0.5}$; $V_{leak}$ denotes the cumulative bedding filtration volume, in $m^3$; t denotes the accumulated fracturing time, in s; h denotes the fracture height, in m; and l denotes the fracture length, in m.

In step S27, whether the fracturing construction is completed is determined based on a relationship between the total time $T_a$ 213 of the hydraulic fracturing and the accumulated fracturing time t 214.

Figure 2C:
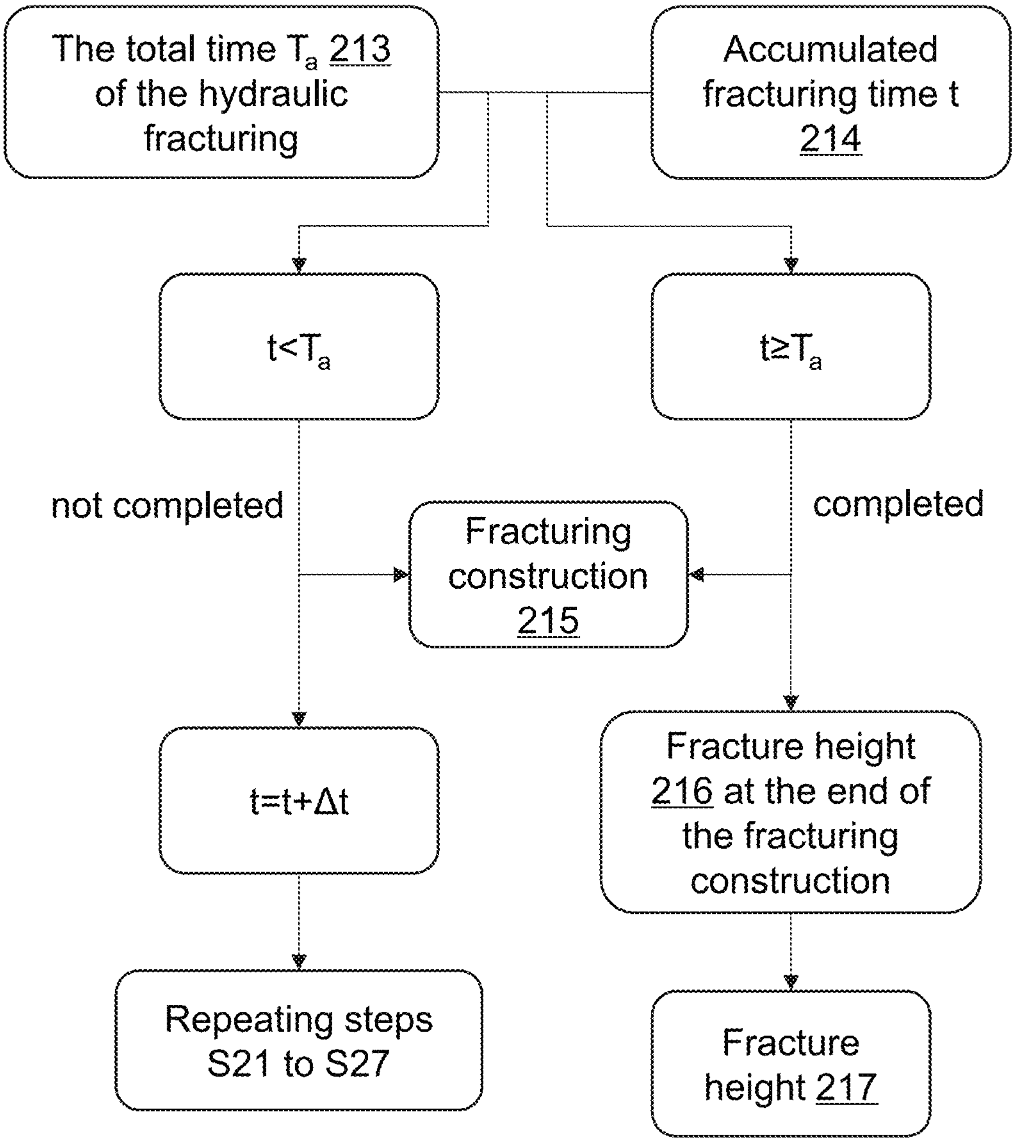
FIG. 2C is a schematic diagram illustrating an exemplary process for determining whether a fracturing construction is completed according to some embodiments of the present disclosure.

FIG. 2C is a schematic diagram illustrating an exemplary process for determining whether a fracturing construction is completed according to some embodiments of the present disclosure. As shown in FIG. 20, if $t<T_a$, it determines that the fracturing construction 215 is not completed, the accumulated fracturing time 214 is updated to $t+\Delta t$, where $\Delta t$ denotes a step size of time, and steps S21 to S27 are repeated; if $t \geq T_a$, it determines that the fracturing construction 215 is completed, and a fracture height 216 at the end of the fracturing construction 215 is determined as the fracture height 217.

In some embodiments of the present disclosure, by performing step S21 to calculate the fluid pressure inside the hydraulic fracture based on the geological parameters, the accumulated fracturing time, and the construction parameters, the fluid pressure inside the fracture can be accurately and timely calculated, providing a basic input for subsequent fracture dimension calculations and avoiding errors caused by static pressure assumptions; by performing step S22 to calculate the fracture width of the hydraulic fracture and step S23 to calculate the fracture length of the hydraulic fracture, the dimensional parameters of the hydraulic fracture can be determined, supporting the subsequent mechanical analysis of height growth; by performing step S24 to calculate the stress intensity factor at the upper tip of the hydraulic fracture, the stress intensity factor at the lower tip of the hydraulic fracture, and the stress in a tip region of the hydraulic fracture, accurate tip stress data is determined, providing dynamic data for subsequent derivations of crossing and propagation; by performing step S25 to calculate the fracture encounter coefficient based on the bedding density and to determine whether the tip of the hydraulic fracture encounters bedding at the current moment, wherein if the tip of the hydraulic fracture does not encounter bedding at the current moment, the stress intensity factor is compared with the reservoir fracture toughness, if the stress intensity factor at the tip of the hydraulic fracture and the reservoir fracture toughness match the expansion critical condition, the fracture height of the hydraulic fracture is updated, or if the stress intensity factor at the tip of the hydraulic fracture and the reservoir fracture toughness do not match the expansion critical condition, the fracture height remains unchanged; if the tip of the hydraulic fracture encounters the bedding at the current moment, the stress intensity factor at the tip of the hydraulic fracture is compared with the bedding fracture toughness, and at the same time, the maximum principal stress of the tip of the hydraulic fracture is compared with the bedding tensile strength, if the stress intensity factor at the tip of the hydraulic fracture and the bedding fracture toughness match the bedding crossing critical condition, and the maximum principal stress of the tip of the hydraulic fracture and the bedding tensile strength also match the bedding crossing critical condition, the fracture height is updated, or if the stress intensity factor at the tip of the hydraulic fracture and the bedding fracture toughness do not match the bedding crossing critical condition, or the maximum principal stress of the tip of the hydraulic fracture and the bedding tensile strength do not match the bedding crossing critical condition, the fracture height remains unchanged, thus by dividing the conditions into two critical criteria based on whether the fracture tip encounters bedding, the deviation in fracture height prediction in traditional models which ignore the interference of bedding on vertical fracture extension is overcome, and the reliability of fracture height prediction is significantly improved by quantifying the difficulty of fracture propagation and bedding crossing using stress data and formation parameters; by performing step S26 to calculate a cumulative bedding filtration volume at the current moment, calculate and update an equivalent filtration coefficient based on the cumulative bedding filtration volume if the tip of the hydraulic fracture encounters the bedding at the current moment, and to dynamically correct the fracturing fluid filtration amount based on the cumulative bedding filtration volume, the deficiency of traditional fixed filtration coefficients is addressed, and the amplification effect of bedding permeability on fluid loss is truly reflected; and by performing step S27 to determine whether the fracturing construction is completed based on the relationship between the total time $T_a$ of the hydraulic fracturing and an accumulated fracturing time t, wherein if $t<T_a$, it determines that the fracturing construction is not completed, the accumulated fracturing time t is updated to $t+\Delta t$, and steps S21 to S27 are repeated, or if $t \geq T_a$, it determines that the fracturing construction is completed, and the fracture height at the end of the fracturing construction is determined as the fracture height, thus by iteratively advancing the simulation based on time steps until the accumulated time reaches the total construction time, a transient simulation of the entire fracturing process is achieved, forming a closed loop with the preceding steps and ensuring that parameters (such as the filtration coefficient, fracture height, etc.) are dynamically updated as the construction progresses.

Example

For the unconventional low-permeability horizontal well W2 (i.e., the target horizontal well), the method for controlling the fracture height in unconventional oil and gas reservoirs under multi-bedding interference described in the present disclosure is used for hydraulic fracturing. The construction parameters and the geological parameters collected for the well W2 are shown in Table 1.

TABLE 1

Construction parameters and geological parameters for the 1st fracturing stage of unconventional low-permeability horizontal well W2

| Parameters | Data | Unit (of measure) |
|---|---|---|
| Viscosity $\mu$ of fracturing fluid | 0.005 | Pa · s |
| Density $\rho_f$ fracturing fluid | 1000 | kg/m$^3$ |
| Displacement q of fracturing fluid | 0.1 | m$^3$/s |
| Count N of perforation clusters | 3 | clusters |
| Total time $T_a$ of a hydraulic fracturing | 3600 | s |
| Expected control height | 30 | m |
| Young's modulus E of a reservoir rock | 25000 | MPa |
| Poisson's ratio v of a reservoir rock | 0.2 | dimensionless |
| Reservoir fracture toughness $K_{IC\text{-}1}$ | 1 | MPa · m$^{1/2}$ |
| Minimum horizontal principal stress $\sigma_h$ | 50 | MPa |
| Vertical stress $\sigma_v$ | 60 | MPa |
| Equivalent filtration coefficient $C_L$ | 8 × 10$^{-5}$ | m/s$^{0.5}$ |
| Bedding tensile strength $T_o$ | 3 | MPa |
| Bedding fracture toughness $K_{IC\text{-}2}$ | 3 | MPa · m$^{1/2}$ |
| Bedding thickness $w_r$ | 1 × 10$^{-4}$ | m |
| Bedding permeability $k_r$ | 8.33 × 10$^{-10}$ | m$^2$ |
| Bedding density $C_k$ | 2 | 1/m |

The accumulated fracturing time is initialized to t=0 s, the fracture encounter coefficient is initialized to $\alpha$=0, the cumulative bedding filtration volume is initialized to $V_{leak}$=0 m$^3$/s, and the count of encountered beddings is initialized to M=0. Step size of the simulation calculation is set to $\Delta$t=2 s, $\Delta$h=0.1 m, and the expected control height is set to $h_c$=30 m.

Figure 3:
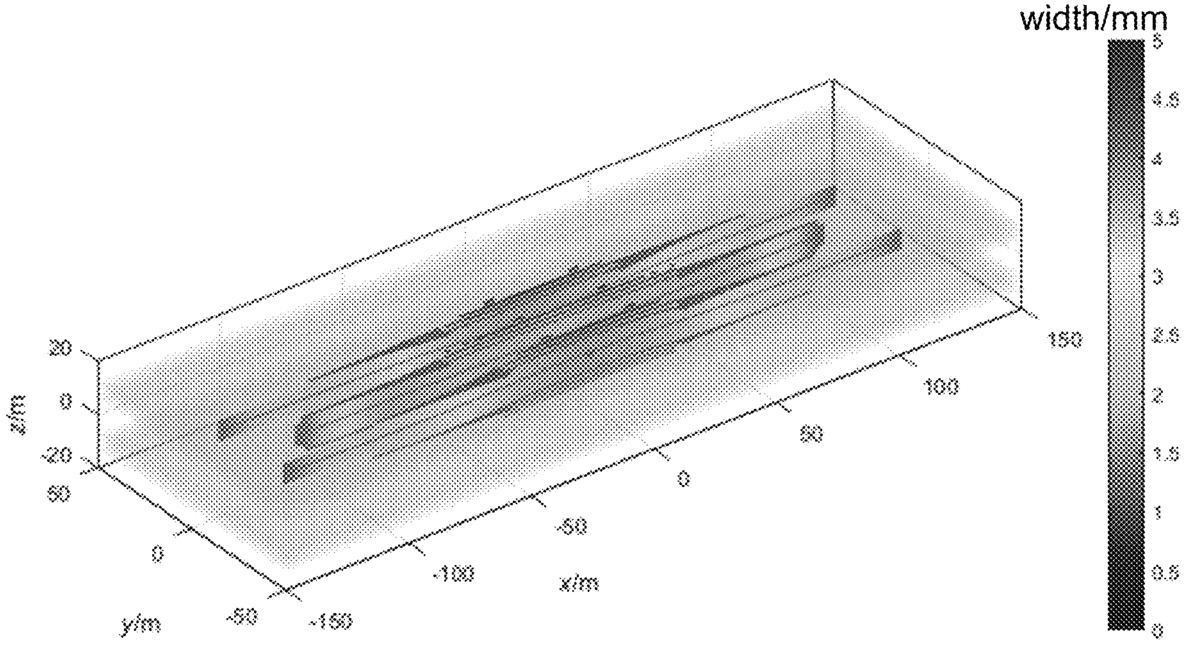
FIG. 3 is a three-dimensional plot of simulated calculation results of multi-cluster fracture dimensions after completion of hydraulic fracturing according to some embodiments of the present disclosure.

FIG. 3 is a three-dimensional plot of simulated calculation results of multi-cluster fracture dimensions after completion of hydraulic fracturing according to some embodiments of the present disclosure. The calculation is performed according to steps S20-S30, and the final simulation result is shown in FIG. 3. The final fracture height h=19.6 m, which is lower than the expected control height $h_c$. Therefore, the design parameters such as the displacement of the fracturing fluid and the total time of the hydraulic fracturing in Table 1 can effectively control the fracture height. Finally, the hydraulic fracturing construction for the target horizontal well is completed according to the design parameters in Table 1.

The foregoing descriptions are not intended to limit the present disclosure in any form. Although the present disclosure has been disclosed through the above-described embodiments, it is not intended to limit the present disclosure. Any person skilled in the art may, without departing from the scope of the technical solution of the present disclosure, make some changes or modifications to equivalent embodiments with equivalent changes by using the technical content disclosed above. However, any simple modification, equivalent change, and modification made to the above embodiments based on the technical substance of the present disclosure, without departing from the content of the technical solution of the present disclosure, shall fall within the scope of the technical solution of the present disclosure.

What is claimed is:

1. A method for controlling a fracture height in unconventional oil and gas reservoirs under multi-bedding interference, comprising:

step S10, obtaining geological parameters of a target horizontal well, and selecting a fracturing fluid according to a production capacity target of the target horizontal well, and preliminarily setting construction parameters;

step S20, determining a hydraulic fracturing process of the target horizontal well based on a hydraulic fracturing model for considering the multi-bedding interference, and evaluating the fracture height;

step S21, calculating a fluid pressure inside a hydraulic fracture based on the geological parameters, an accumulated fracturing time, and the construction parameters;

step S22, calculating a fracture width of the hydraulic fracture;

step S23, calculating a fracture length of the hydraulic fracture;

Step S24, calculating a stress intensity factor at an upper tip of the hydraulic fracture, a stress intensity factor at a lower tip of the hydraulic fracture, and a stress in a tip region of the hydraulic fracture;

step S25, calculating a fracture encounter coefficient based on a bedding density, and determining whether a tip of the hydraulic fracture encounters bedding at a current moment, if the tip of the hydraulic fracture does not encounter the bedding at the current moment, comparing a stress intensity factor at the tip of the hydraulic fracture with a reservoir fracture toughness, if the stress intensity factor at the tip of the hydraulic fracture and the reservoir fracture toughness match an expansion critical condition, updating the fracture height of the hydraulic fracture, or if the stress intensity factor at the tip of the hydraulic fracture and the reservoir fracture toughness do not match the expansion critical condition, remaining the fracture height unchanged;

if the tip of the hydraulic fracture encounters the bedding at the current moment, comparing the stress intensity factor at the tip of the hydraulic fracture with a bedding fracture toughness, and at the same time, comparing a maximum principal stress of the tip of the hydraulic fracture with a bedding tensile strength, if the stress intensity factor at the tip of the hydraulic fracture and the bedding fracture toughness match a bedding crossing critical condition and the maximum principal stress of the tip of the hydraulic fracture and the bedding tensile strength also match the bedding crossing critical condition, updating the fracture height, or if the stress intensity factor at the tip of the hydraulic fracture and the bedding fracture toughness do not match the bedding crossing critical condition, or the maximum principal stress of the tip of the hydraulic fracture and the bedding tensile strength do not match the bedding crossing critical condition, remaining the fracture height unchanged;

step S26, if the tip of the hydraulic fracture encounters the bedding at the current moment, calculating a cumulative bedding filtration volume at the current moment, and calculating and updating an equivalent filtration coefficient based on the cumulative bedding filtration volume; and step S27, determining whether a fracturing construction is completed based on a relationship between the total time $T_a$ of the hydraulic fracturing and the accumulated fracturing time t:

if $t<T_a$, determining that the fracturing construction is not completed, updating the accumulated fracturing time t to $t+\Delta t$, and repeating steps S21 to S27, or if $t \geq T_a$, determining that the fracturing construction is completed, a calculation is complete, and obtaining a final fracture height;

step S30, comparing the final fracture height with an expected control height, if the final fracture height is greater than the expected control height, reducing a displacement of the fracturing fluid or a total time of a hydraulic fracturing, and repeating step S20 and step S30 until the final fracture height is less than the expected control height, and proceeding to step S40; and step S40, performing the hydraulic fracturing on the target horizontal well based on updated construction parameters.

2. The method according to claim 1, wherein the geological parameters include a Young's modulus of a reservoir rock E, a Poisson's ratio v of a reservoir rock, a reservoir fracture toughness $K_{IC-1}$, a minimum horizontal principal stress $\sigma_h$, a vertical stress $\sigma_v$, a bedding tensile strength $T_a$, a bedding fracture toughness $K_{IC-2}$, a bedding thickness $w_r$, a bedding permeability $k_r$, a bedding density $C_k$, and an equivalent filtration coefficient $C_L$.

3. The method according to claim 1, wherein the construction parameters include a count N of perforation clusters, a perforation height $h_{cp}$, a viscosity $\mu$ of the fracturing fluid, a density $p_f$ of the fracturing fluid, the displacement $q_0$ of the fracturing fluid, and the total time $T_a$ of the hydraulic fracturing.

4. The method according to claim 1, wherein the step S20 includes: calculating a fluid pressure inside a hydraulic fracture, a fracture width, a fracture length, and the fracture height based on the hydraulic fracturing model for considering the multi-bedding interference.

5. The method according to claim 1, wherein the expansion critical condition in the step S25 includes that the stress intensity factor at the tip of the hydraulic fracture is greater than or equal to the reservoir fracture toughness.

6. The method according to claim 1, wherein the bedding crossing critical condition in the step S25 includes that the stress intensity factor at the tip of the hydraulic fracture is greater than or equal to the bedding fracture toughness, and the maximum principal stress of the tip of the hydraulic fracture is greater than or equal to the bedding tensile strength.

7. The method according to claim 1, wherein the step S25 further includes:

selecting, based on a position of the tip of the hydraulic fracture in contact with the bedding, whether the stress intensity factor at the tip of the hydraulic fracture is the stress intensity factor at the upper tip of the hydraulic fracture or the stress intensity factor at the lower tip of the hydraulic fracture.

8. The method according to claim 1, wherein the step S10 further includes:

determining a slipped bedding area using a shear slip model based on the geological parameters, an environmental parameter, formation stress field variation data, and candidate construction parameters; and determining the construction parameters based on the slipped bedding area.

9. The method according to claim 8, wherein the construction parameters further include an injection parameter, the injection parameter including an injection rate curve of the fracturing fluid.

10. The method according to claim 8, wherein the construction parameters are generated based on an optimization search algorithm.

11. The method according to claim 8, wherein an input to the shear slip model includes an optimal perforation location.

12. The method according to claim 1, wherein the method further comprises:

determining an optimal perforation location based on the geological parameters and a bedding attitude; and during a perforation operation phase, generating a perforation operation instruction and sending the perforation operation instruction to perforating equipment, and controlling the perforating equipment to run into the optimal perforation location to perform a perforation operation through the perforation operation instruction.

13. The method according to claim 12, wherein the determining an optimal perforation location includes:

constructing a three-dimensional bedding model based on a geographic parameter, a bedding attitude, seismic data, and a bedding composition of each candidate perforation location of the target horizontal well; and determining the optimal perforation location based on the three-dimensional bedding model.

14. The method according to claim 1, wherein the performing the hydraulic fracturing on the target horizontal well based on updated construction parameters includes:

generating, based on a count of perforation clusters and a perforation height in the updated construction parameters, a perforation operation instruction and sending the perforation operation instruction to perforating equipment, the perforation operation instruction controlling the perforating equipment to shoot perforation clusters into a formation, a count of the perforation clusters being the count of perforation clusters in the updated construction parameters, and a depth of the perforation clusters being the perforation height in the updated construction parameters;

generating, based on the total time of the hydraulic fracturing in the updated construction parameters, a time control instruction and sending the time control instruction to a fracturing pump, the time control instruction controlling the fracturing pump to generate a stop signal when an accumulated fracturing time reaches the total time of the hydraulic fracturing in the updated construction parameters to terminate an injection of the fracturing fluid by the fracturing pump;

generating, based on the displacement of the fracturing fluid in the updated construction parameters, a first displacement control instruction and sending the first displacement control instruction to the fracturing pump, the first displacement control instruction controlling the fracturing pump to operate at a specific speed to maintain a displacement of the fracturing fluid in the fracturing pump at the displacement of the fracturing fluid in the updated construction parameters; and generating, based on a viscosity and a density of the fracturing fluid in the updated construction parameters, a fracturing fluid control instruction and sending the fracturing fluid control instruction to a raw material blending unit, the fracturing fluid control instruction controlling the raw material blending unit to deliver different components of the fracturing fluid to the fracturing pump at different rates, so that a viscosity and a density of the fracturing fluid in the fracturing pump being as the viscosity and the density of the fracturing fluid in the updated construction parameters.

15. The method according to claim 14, wherein the method further comprises:

generating, based on an injection rate curve in the updated construction parameters, a second displacement control instruction and sending the second displacement control instruction to the fracturing pump, the second displacement control instruction controlling the fracturing pump to operate at a specific speed so that the displacement of the fracturing fluid in the fracturing pump meeting a displacement requirement at each time point.

* * * * *